United States Patent
Rao et al.

(10) Patent No.: US 11,653,252 B2
(45) Date of Patent: May 16, 2023

(54) SYSTEMS AND METHODS OF DETECTING AND PREDICTING QUALITY OF SERVICE OF COMMUNICATION LINKS OF CONNECTED VEHICLES

(71) Applicant: Ford Global Technologies, LLC, Dearborn, MI (US)

(72) Inventors: Jayanthi Rao, West Bloomfield, MI (US); Ivan Vukovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 17/200,142

(22) Filed: Mar. 12, 2021

(65) Prior Publication Data
US 2022/0295336 A1    Sep. 15, 2022

(51) Int. Cl.
*H04W 28/02* (2009.01)
*H04W 4/40* (2018.01)
*H04L 43/0852* (2022.01)
*H04W 24/08* (2009.01)
*H04L 43/0829* (2022.01)
*H04W 4/02* (2018.01)

(52) U.S. Cl.
CPC ..... *H04W 28/0268* (2013.01); *H04L 43/0829* (2013.01); *H04L 43/0852* (2013.01); *H04W 4/023* (2013.01); *H04W 4/40* (2018.02); *H04W 24/08* (2013.01)

(58) Field of Classification Search
CPC ... H04W 28/0268; H04W 4/023; H04W 4/40; H04W 24/08; H04L 43/0829; H04L 43/0852
See application file for complete search history.

(56) References Cited

U.S. PATENT DOCUMENTS

| | | | |
|---|---|---|---|
| 10,568,115 B2* | 2/2020 | Lee | H04W 4/40 |
| 2017/0011562 A1* | 1/2017 | Hodges | H04W 4/46 |
| 2017/0032402 A1 | 2/2017 | Patsiokas et al. | |
| 2018/0035398 A1* | 2/2018 | Lee | H04W 56/0015 |
| 2020/0037301 A1* | 1/2020 | Park | H04B 7/0848 |
| 2020/0112872 A1* | 4/2020 | Nimbavikar | H04W 72/10 |
| 2020/0112907 A1* | 4/2020 | Dao | H04M 15/84 |

(Continued)

OTHER PUBLICATIONS

Silva etal, "A Survey on Infrastructure-Based VehicularNetworks", Hindawi Mobile Information Systems, vol. 2017, Article ID6123868, 29 pages.

(Continued)

*Primary Examiner* — Hassan Kizou
*Assistant Examiner* — Hector Reyes
(74) *Attorney, Agent, or Firm* — Brandon Hicks; Eversheds Sutherland (US) LLP

(57) ABSTRACT

Systems and methods of detecting and predicting quality of service links for connected vehicles are provided herein. An example method receiving, by a first connected vehicle, a signal that includes at least a quality of service metric of a communications link, determining an action to be executed by the first connected vehicle, determining when the quality of service metric of the communications link for the first connected vehicle is at or above a threshold value, and executing the action by the first connected vehicle when the quality of service metric is at or above a threshold value.

20 Claims, 5 Drawing Sheets

(56) References Cited

U.S. PATENT DOCUMENTS

2020/0219386 A1* 7/2020 El Assaad ............ G08G 1/0112
2020/0280827 A1* 9/2020 Fechtel .................. H04W 4/40
2021/0306837 A1* 9/2021 Reimann ................ H04W 4/46
2022/0201783 A1* 6/2022 Jones ..................... H04L 5/001

OTHER PUBLICATIONS

Feng et al, "A Safety Message Broadcast Strategy in Hybrid Vehicular Network Environment", The British Computer Society, Section B: Computer and Communications Networks and Systems, The Computer Journal, 2017, 9 pages.

* cited by examiner

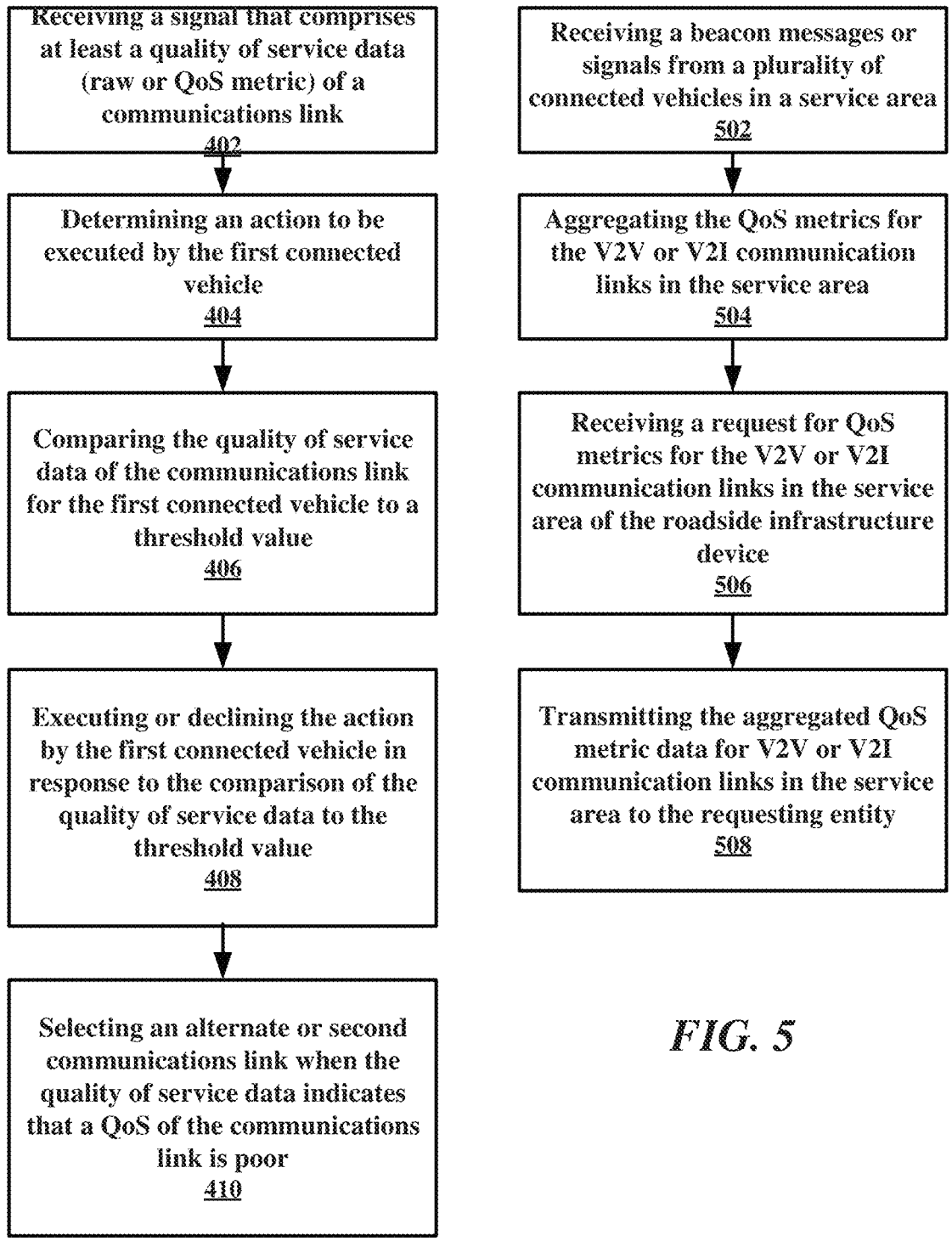

SYSTEMS AND METHODS OF DETECTING AND PREDICTING QUALITY OF SERVICE OF COMMUNICATION LINKS OF CONNECTED VEHICLES

TECHNICAL FIELD

The present disclosure relates to controlled vehicle communications, and more specifically, but not by limitation, to systems and methods that allow for detection and/or prediction the quality of service metrics for communications links between connected vehicles.

BACKGROUND

V2X (vehicle to everything) technology such as vehicle-to-vehicle (V2V) and vehicle-to-infrastructure (V2I) involves establishment of communications links. These communications links can become congested for a variety reasons such as when bandwidth is low, when too many vehicles are communicating in a specific area, and so forth. Reduction in a quality of service (QoS) of a communications link in a V2X context can lead to deleterious effects. In one example, a maneuver which involves multi-car lane merge might benefit from V2V communication between vehicle participants over a length from hundreds of meters to a few kilometers. The V2V communication will need to be available from the start until the end of the maneuver. If unavailable, connected vehicles may collide resulting in damage. Within a maneuver distance the V2V radio frequency (RF) environment (e.g., QoS) can change from a lightly loaded to highly loaded. An example of this scenario is when connected vehicles involved in a maneuver pass by a traffic jam at a tollbooth exit. Generally speaking, an impaired QoS in the communication links between the vehicles (e.g., V2V) and/or to the infrastructure (e.g., V2I) can render these maneuvers difficult and dangerous, if not impractical.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 4 is a flowchart of an additional example method of the present disclosure related to operations of an example connected vehicle of the present disclosure.

FIG. 5 is a flowchart of an additional example method of the present disclosure related to operations of an example roadside infrastructure device of the present disclosure.

DETAILED DESCRIPTION

Overview

Figure 1:
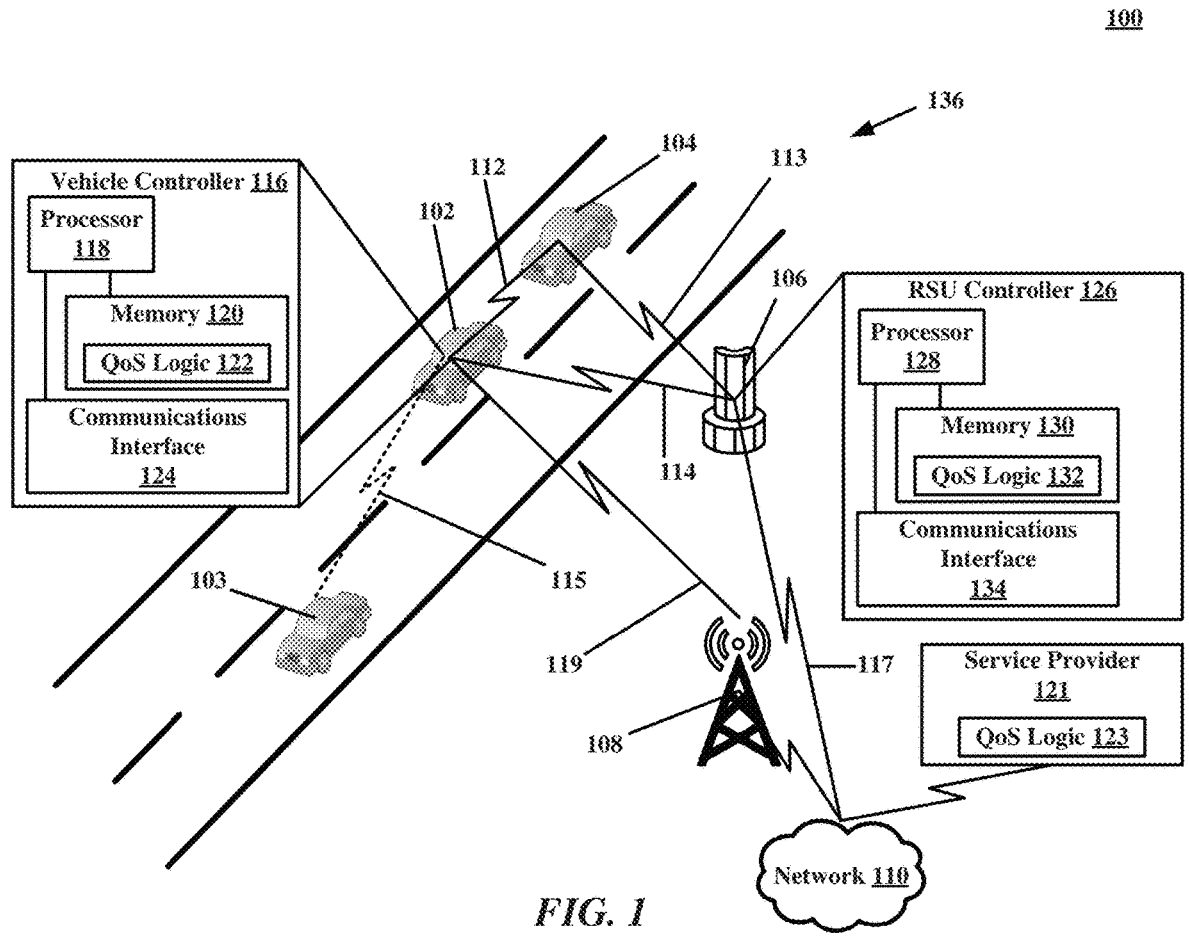
FIG. 1 depicts an illustrative architecture in which techniques and structures for providing the systems and methods disclosed herein may be implemented.

The systems and methods disclosed herein are configured, in some embodiments, to provide for detecting and predicting the quality of service (QoS) of a communications link(s). These communications links can include vehicle-to-vehicle (V2V) connections, where connected vehicles are exchanging messages or signals with one another. A QoS metric may relate to a quality of the communications link shared between two or more connected vehicles, as may be reflected in a measured packet error rate.

The communications links can also include vehicle-to-infrastructure (V2I) connections where connected vehicles exchange messages with roadside infrastructure devices, such as road side units (RSUs) or through cellular networks. A QoS metric may relate to a quality of the communications link between the vehicle and either the road infrastructure device or cellular network, as may be reflected in a measured packet error rate. Example roadside infrastructure devices can receive the QoS metrics from one or more vehicles and analysis the QoS metric data to determine QoS issues with the communications links and/or predict the QoS of communications links at a location. The infrastructure device can transmit messages including the QoS determinations and/or the prediction of the QoS of the communications links at another location to connected vehicles.

Connected vehicles can utilize this QoS metric data to determine if certain actions to be performed by the connected vehicles, which may include one or more connected communications among or between the connected vehicles, can be accomplished. Generally speaking, in order to determine to start a maneuver, it is advantageous for a connected vehicle to know whether V2V communication among the participant vehicles can take place. Thus, it is desirable to convey to the connected vehicles the QoS metric data of the V2V connections at the present time/location and/or predicted for a range of travel related to one or more maneuvers (for example, a distance equal to or great than that needed for the maneuver to be completed).

Connected vehicles can broadcast a local congestion state together with a congestion state of neighboring connected vehicles. In another example, a roadside infrastructure device can detect a congestion state a given area. In yet another example, a cellular network infrastructure device can receive information from connected vehicles or roadside infrastructure device(s) and makes this information available on request to connected vehicles.

Connected vehicles can monitor the quality of V2V connections based on messages (e.g., basic safety messages (BSM)) received from other vehicles in their vicinity. These connected vehicles can share this QoS metric data periodically with roadside infrastructure devices and/or cellular base-stations in their range. These infrastructure devices may aggregate this QoS metric data and provide V2V quality information in a certain region upon request. This data can be used by connected vehicles to make decisions about whether or not to attempt certain collaborative maneuvers using local communication or to use alternate means (such as using a cellular network connection) to do so.

An infrastructure device can monitor one or more communications links and determine that if the communications links have poor QoS in a particular geo-fenced area. This information is available for broadcast to other target areas or on demand.

Illustrative Embodiments

Turning now to the drawings, FIG. 1 depicts an illustrative architecture 100 in which techniques and structures of the present disclosure may be implemented. The illustrative architecture 100 may include one or more connected vehicles such as a first connected vehicle 102, a second connected vehicle 104, one or more infrastructure devices such as a roadside infrastructure device 106, and a cellular base station 108. The objects in FIG. 1 can communicate over a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct. For example, the connected vehicles 102 and 104 can connect the network 110 through the cellular base station 108. Likewise, the roadside infrastructure device 106 can connect the network 110 through the cellular base station 108 using a communications link 117. The connected vehicles, such as the connected vehicle 102 can couple to the cellular base station 108 through a cellular connection 119. According to some embodiments, the architecture 100 can also comprise a service provider 121 that can be embodied as a server or a cloud computing environment. The service provider 121 comprises QoS logic 123 that allows the service provider 121 to perform any aspect of QoS metric analysis described herein. The service provider 121 can provide QoS metric determinations in combination with other components of the architecture such as the connected vehicles 102 and 104, or the roadside infrastructure device 106.

Broadly, a connected vehicle of the present disclosure may be configured to monitor periodic beacon messages received from other connected vehicles in their vicinity. The connected vehicle can track a QoS of a communications link used by the connected vehicles as a function of distance (or distance range), in some embodiments. Connected vehicles can report their location and QoS metrics periodically to roadside unit/s within their transmission range. If a connected vehicle is equipped with hardware that enables connectivity to mobile network (3G, 4G, V2N (vehicle to everything) connectivity), then the same information could be sent to the cellular base station 108 as well.

In more detail, some objects in FIG. 1 can communicate using a V2V communications link or connection. For example, the first connected vehicle 102 and the second connected vehicle 104 can communicate with one another over a V2V communications link 112. Alternatively, some objects in FIG. 1 are configured to communicate using a V2I communications link or connection. For example, one or more of the first connected vehicle 102 and the second connected vehicle 104 can be configured to communicate with the roadside infrastructure device 106 over a V2I communications link, such as V2I communications link 114, between the second connected vehicle 104 and the roadside infrastructure device 106.

When the first connected vehicle 102 and the second connected vehicle 104 are unable to communicate with one another over the V2V communications link 112, the first connected vehicle 102 and the second connected vehicle 104 can communicate with one another through V2I communications. For example, the first connected vehicle 102 can transmit signals or messages to the second connected vehicle 104 by transmitting the signals or messages to the roadside infrastructure device 106 using the V2I communications link 114. The second connected vehicle 104 can transmit and/or receive data using another V2I communications link 113. The roadside infrastructure device 106 can transmit the signals or messages to the second connected vehicle 104 over the V2I communications link 114 or another separate V2I communications link. The roadside infrastructure device 106 can act as a communication proxy between the first connected vehicle 102 and the second connected vehicle 104.

V2V and V2I communications links are wireless radio frequency (RF) channels. A QoS of the any of the V2V and V2I communications links may be degraded for any number of reasons. For example, when the first connected vehicle 102 and the second connected vehicle 104 are located in proximity to other connected vehicles, a V2V communications link (e.g., RF channel) used by the connected vehicles to transmit and/or receive may become congested or saturated with signals or messages.

In one example, connected vehicles in a given location can periodically exchange beacon messages, referred to generally as basic safety messages (BSMs). These beacon messages can include information such as a vehicle identifier, a current location, a direction of travel, a velocity, and so forth. These beacon messages can be augmented to include QoS metric data. Aspects of QoS metric data will be discussed in greater detail infra.

When too many connected vehicles are exchanging beacon messages in a given location, the V2V links between connected vehicles may become congested, which may lead to jitter, lag, message contention, delay, or other deleterious effects in the V2V communications link 112. This congestion may negatively affect the exchange of beacon messages between the connected vehicles 102 and 104. For example, if the first connected vehicle 102 receives too many messages from other connected vehicles in the area, the first connected vehicle 102 may be unable to transmit to, or receive data from, the second connected vehicle 104. Similar QoS issues can exist with V2I communications links when too many connected vehicles are communicating with an infrastructure device over a V2I communications link, or when connected vehicles are communicating with one another through V2I connection, such as the V2I communications link 114.

Generally, the devices disclosed herein can determine when a QoS issue exists in a V2V communications link or a V2I communications link. In response, the devices disclosed herein can respond to QoS issues by attempting to utilize an alternative communication method. For example, if a connected vehicle determines a QoS issue exists in a V2V communications link, the connected vehicle can select to use a V2I communications link. When a connected vehicle determines a QoS issue exists in a V2V communications link, the connected vehicle may determine that proposed actions to be performed by the connected vehicle should be delayed or not performed. If an infrastructure device determines a QoS issue exists in a V2I communications link, the infrastructure device (such as roadside infrastructure device 106) can choose to route messages or signals through a cellular network connection. The roadside infrastructure device 106 can monitor the QoS of a V2V communications link based on receiving beacon messages from connected vehicles in a service area over which the roadside infrastructure device 106 operates.

QoS generally refers to a quality of a communications link utilized between at least two devices for communicating data. Raw QoS data can be received and processed by a connected vehicle, a roadside infrastructure device, or a service provider to create one or more QoS metric(s). The raw QoS data can include, as noted above, RF spectrum information, or raw QoS data could include a volume of data being transmitted on a specific RF channel, such as a V2V communications link. The connected vehicle can also receive a QoS metric from another connected vehicle or a roadside infrastructure device.

A QoS metric, as utilized herein, includes any indicator of QoS. Examples of QoS metrics includes, but are not limited to, a packet error rate, an inter-packet delay for packets, a hearing range (e.g., a distance between communicating entities using a communications link), a number of messages or signal volume of a communications link (e.g., how many messages or signals are being received by a connected vehicle from other connected vehicles in communications proximity which indicate a volume of messages being exchanged by the connected vehicles), a number of entities communicating with one another in a given area, an available bandwidth of a communications link, or combinations thereof. In general, any QoS metric related to latency, throughput, reliability, or other similar communications link or network attribute can be used as a basis for determining a QoS.

A connected vehicle of the present disclosure can be configured to perform a QoS metric analysis. The infrastructure devices can be configured to perform a QoS metric analysis. The QoS metric analysis can occur at both the connected vehicle level and the infrastructure device level.

A QoS metric analysis can include comparing a QoS metric to a QoS threshold value. For example, when a QoS metric indicates that an available bandwidth of a communications link is at or below a bandwidth threshold, the communications link associated is determined to be congested. When a QoS metric indicates that a packet error rate of a communications link is at or above a packet error rate threshold, the communications link associated with the QoS metric is determined to be congested. In this example, the packet error rate could include a number of packets being dropped due to overuse of the communications link. Some QoS metrics can be inferential in nature. For example, when a QoS metric includes a number of entities (such as connected vehicles) which are at or above a volume threshold, it is assumed that V2V communications between vehicles may be impaired due to congestion. Thus, the QoS may relate to a specific communications link or may relate to a likelihood that a communications link can be utilized based on QoS metrics in a service area.

With respect to hearing range, the V2V communications link 115 between the first connected vehicle 102 and a third connected vehicle 103 is illustrated in dotted line to indicate that the hearing range (distance between the connected vehicles) is large enough that a QoS of the V2V communications link 115 is at or below a threshold, such as a RF signal quality value, which could include signal strength indicator, which is communicated between devices. An example signal strength indicator would include Received Signal Strength Indicator (RSSI) in Wi-Fi, which is a function of distance and physical interference created by objects such other vehicles, buildings, trees, and so forth.

In the example, the first connected vehicle 102 could transmit data to the third connected vehicle 103 over the V2I communications link 114 (assuming a QoS of the V2I communications link 114 is sufficient).

The QoS metric analysis can be applied in some embodiments by determining if a connected vehicle should perform an action, or used to modify an action. For example, if the first connected vehicle 102 is to perform an action, such as a lane exit from a highway, and this action utilizes navigation data obtained over a communications link, an analysis of a QoS of the communications link used to provide the navigation data can be performed. To be sure, this is an example of a QoS metric being used in an assessment that controls the performance of an action by a single vehicle. Additionally, the action in question could include the launching of an application available through a human machine interface (HMI) of the vehicle. In times of congestion, an application that utilizes a V2V or V2I communications link for transmitting or receiving data could be prevented from opening and further compromising the QoS of the communications link.

Some embodiments may include assessing QoS metric(s) within the context of two or more connected vehicles performing a coordinated action. For example, if the first connected vehicle 102 and the second connected vehicle 104 are to execute a coordinated action such as a lane merge, the connected vehicles 102 and 104 can each independently assess a QoS metric of the V2V communications link 112 prior to undertaking the coordinated action of the lane merge. At least one of the connected vehicles 102 and 104 can perform the QoS metric analysis and transmit the results thereof to the other connected vehicle. In these examples, the V2V communications link 112 can comprise a common RF channel used by many other vehicles or IoT devices (Internet-of-Things) in the vicinity of the connected vehicles 102 and 104, which could lead to congestion on the common RF channel.

The first connected vehicle 102 is configured with a vehicle controller 116 that comprises a processor 118 and memory 120. The memory 120 stores instructions, such as QoS logic 122 that can be executed by the processor 118 to perform aspects of QoS monitoring and vehicular control (e.g., execution of actions). When referring to operations executed by the vehicle controller 116 it will be understood that this includes the execution of instructions by the processor 118. The first connected vehicle 102 can also comprise a communications interface 124 that can be used to transmit and receive data on any desired communications link, such as V2V and/or V2I. For purposes of brevity, it will be understood that the second connected vehicle is similarly configured to the first connected vehicle 102. The vehicle controller 116 utilizes the QoS logic 122 to assess a QoS for a V2V or a V2I communications link. The QoS logic 122 generates one or more QoS metrics and transmits the QoS metric over the V2V communications link 112 to adjacent connected vehicles, such as the second connected vehicle 104. The QoS metric can also be transmitted to the roadside infrastructure device 106 over the V2I communications link 114. In another embodiment, the vehicle controller 116 can determine if a QoS metric for the V2I communications link 114 is at or below a threshold in a similar manner.

The vehicle controller 116 can assess the QoS metric of a V2V or a V2I communications link. If one of these types of communications links is determined to have a QoS metric that is indicative of congestion while the other is not congested, the vehicle controller 116 can select the use of the non-congested communications link. For example, if the vehicle controller 116 determines that the QoS metric for the V2V communications link 112 indicates congestion in the V2V communications link 112, the vehicle controller 116 can select the V2I communications link 114 to use when performing an action, such as a lane merge or exit. The vehicle controller 116 can receive QoS metric data from other connected vehicles such as the second connected vehicle, and perform the aforementioned using that QoS metric data.

Infrastructure devices, such as the roadside infrastructure device 106 can be configured with an RSU controller 126 which comprises a processor 128 and a memory 130. The memory 130 stores instructions, such as QoS logic 132 that can be executed by the processor 128 to perform aspects of QoS monitoring or QoS metric transmission. When referring to operations executed by the RSU controller 126 it will be understood that this includes the execution of instructions by the processor 128. The roadside infrastructure device 106 can also comprise a communications interface 134 that can be used to transmit and receive data on any desired communications link, such as a V2I communications link.

In general, the RSU controller 126 can receive messages or signals from connected vehicles in a service area 136 in which the roadside infrastructure device 106 is operating. This service can include the provision of the V2I communications link 114 in some embodiments. As connected vehicles enter and exit the service area 136, the messages or signals transmitted to the roadside infrastructure device 106 by connected vehicles in the service area 136 can be aggregated and analyzed. That is, the RSU controller 126 can be configured to execute the QoS logic 132 to determine if there is congestion in any of the V2V communications links used by connected vehicles in the service area 136 and/or the V2I communications link 112. For example, the RSU controller 126 can determine if an available bandwidth for the V2I communications link 114 is at or below a bandwidth threshold. The service area 136 can be defined by a geo-fence in some embodiments. The geo-fence could include, for example, a service area as referenced in examples provided herein. The RSU controller 126 can establish and maintain geo-fence around the service area 136, or any other suitable area. The RSU controller 126 can evaluate the QoS metrics for V2V communications and/or V2I communications occurring within the geo-fence. Comparisons of connected vehicle locations with geo-fence coordinates can be used to determine distances between connected vehicles and service areas, which can be used by connected vehicles outside the geo-fence to determine if an action should be attempted.

In another example QoS metric analysis, the RSU controller 126 can determine if an aggregate number of connected vehicles in the service area 136 is at or above a threshold. If the aggregate number if connected vehicles in the service area 136 meet or exceed the threshold, the RSU controller 126 can determine or predict that the V2V communications link 112 is likely to be congested. Thus, the RSU controller 126 can provide direct/empirical assessments or predictions for congestion on the V2V communications link 112 and/or the V2I communications link 112. The RSU controller 126 can aggregate QoS metric data over a fixed time window (e.g., period of time). In one or more embodiments, the aggregated QoS metric data can be transmitted to a cloud repository for storage, or the aggregated QoS metric data can be stored locally at the roadside infrastructure device 106. The aggregated QoS metric data can be gathered, processed, and retained on a rolling basis as time progresses.

The RSU controller 126 can aggregate QoS metrics received from the messages/signals provided by connected vehicles in the service area 136 and provide these aggregated QoS metrics to connected vehicles upon request. In one example, the RSU controller 126 can receive a request from a connected vehicle inside the service area 136 and provide the aggregated QoS metrics to the requesting vehicle, or an indication thereof, such as an encoded message of the level of congestion or what level and/or type of activity is allowed based on the QoS analysis. In another example, the RSU controller 126 can receive a request from a connected vehicle outside the service area 136 and provide the aggregated QoS metrics to the requesting vehicle. Providing QoS metrics to a connected vehicle outside of the service area 136 of the RSU controller 126 is beneficial when the connected vehicle outside of the service area 136 will be entering the service area 136 at a point in the future (e.g., predicted location). A request may not be required. For example a connected vehicle outside of the service area 136 may be provided with aggregated QoS metrics when the RSU controller 126 determines that the connected vehicle will enter the service area 136. Data indicative of this type of vehicle movement can be obtained from another roadside infrastructure device or from a cellular base station.

Connected vehicles can periodically request QoS metric (s) of a V2V connection (vehicle-to-vehicle connection) in a certain location/region based on their route or predicted location in the near future. The connected vehicles can also request these QoS metrics when the connected vehicles intend to perform certain collaborative maneuvers that depend on the availability of V2V messaging capability. The availability of V2V messaging capability may be required for a duration of time needed to perform the collaborative maneuvers (e.g., coordinated action). Generally, the duration of time (e.g., time frame) needed to perform a collaborative maneuver can be based on a current velocity of the connected vehicles, and an estimated time required to perform the maneuver. For example, a lane merge maneuver may benefit from one minute to perform by connected vehicles. If the connected vehicles are traveling at a speed of 50 miles per hour (mph), the connected vehicles could obtain QoS metrics for a V2V communications link over a distance of approximately a mile extending between a current location of the connected vehicles and a point at which the maneuver is estimated to be complete.

Infrastructure devices such as the roadside infrastructure device 106 or the cellular base station 108 can use the route information to populate a QoS metric data for areas the connected vehicles will enter during the maneuver. For example, the connected vehicles may begin the maneuver in service area 136, but may cross through one or more additional service areas during the maneuver. QoS metrics can be obtained from infrastructure devices in these one or more additional service areas or from connected vehicles in these additional service areas.

Figure 2:
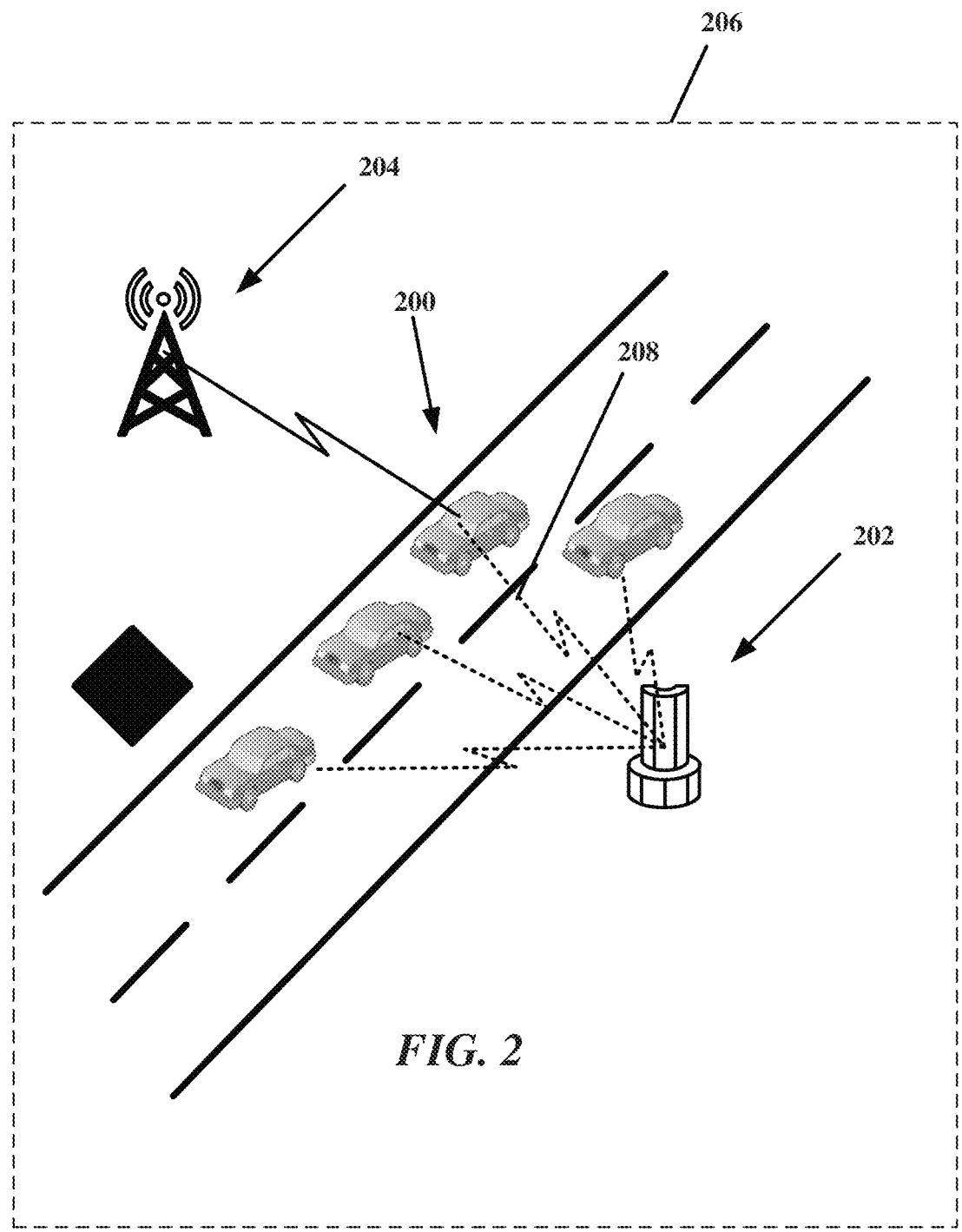
FIG. 2 depicts an example environment where techniques and structures for providing the systems and methods disclosed herein may be implemented.

FIG. 2 illustrates another example use case of the present disclosure where a plurality of connected vehicles 200 are located near one another due to traffic created by road construction. V2I links (e.g., vehicle-to-infrastructure connection), such as V2I link 208, between each of the connected vehicles plurality of connected vehicles 200 and the roadside infrastructure device 202 are illustrated in dotted line due indicating poor QoS. It will be understood that this traffic congestion causes poor QoS in V2V links (not shown) between the plurality of connected vehicles 200. Rather than providing message or signals comprising the QoS metric to the roadside infrastructure device 202, the plurality of connected vehicles 200 can transmit the message or signals comprising the QoS metric to the cellular base station 204. In this way the cellular base station 204 can broadcast the QoS metric(s) to connected vehicles which may enter a service area 206 around the cellular base station 204.

The message or signals comprising the QoS metric can be selectively transmitted to vehicles that are determined to enter the service area 206 in the future (e.g., predicted location). Thus, the roadside infrastructure device 202 and/or the cellular base station 204 can be configured to process beacon message data for each of the connected vehicles that include information such as location, speed, direction of travel, vehicle identifiers, and so forth. Processing of these messages can include determining which connected vehicles may enter the service area 206 and providing such connected vehicles with QoS metric data for the service area 206. Again, this can include QoS metric data V2V or V2I communications links in the service area 206.

Figure 3:
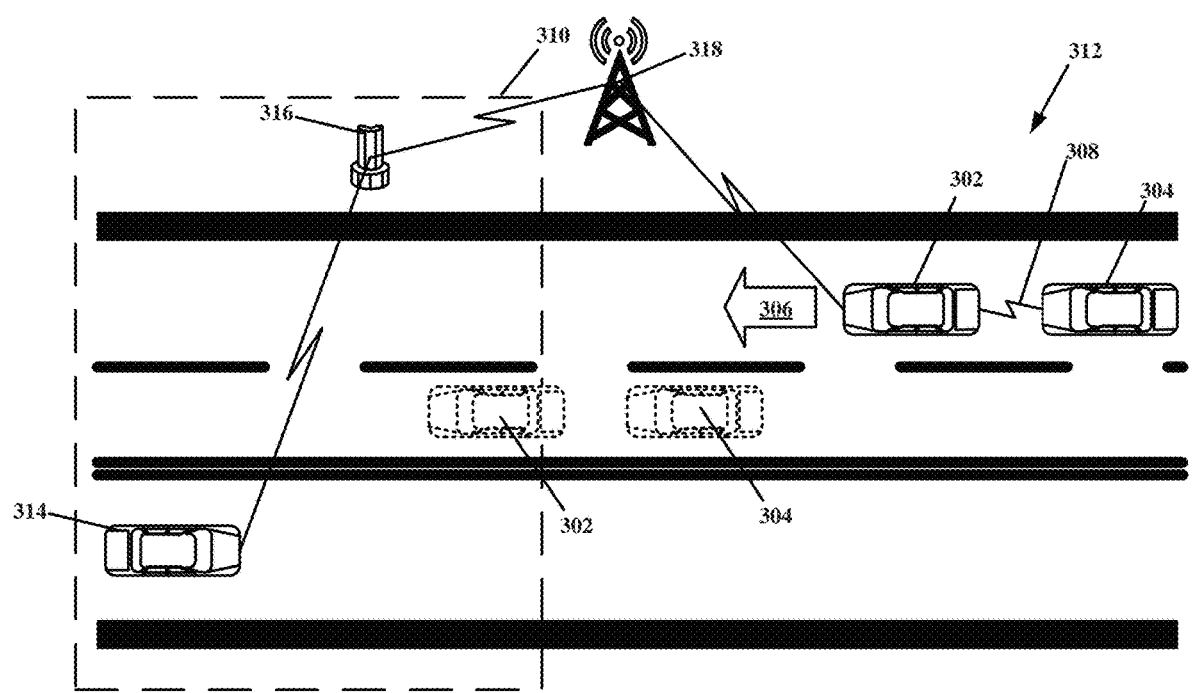
FIG. 3 is another example environment where techniques and structures for providing the systems and methods disclosed herein may be implemented.

FIG. 3 illustrates another example use case of the present disclosure. Two connected vehicles 302 and 304 are moving in a direction of travel 306 on a highway. The connected vehicles 302 and 304 can communicate with one another over a V2V communications link 308. In this example, the connected vehicles 302 and 304 are attempting to determine if a coordinated action, such as a lane merge can be performed based on a QoS of the V2V communications link 308. Positions of the connected vehicles 302 and 304 are illustrated in dotted line in FIG. 3 to indicate a location of the connected vehicles 302 and 304 after performing the lane merge.

As noted above, this coordinated action has a duration of time and the vehicles are connected vehicles 302 and 304 are traveling at a specific velocity. Due to these factors, the coordinated action may bring the vehicles into a distant area 310 that is located away from a current location 312. Thus, a QoS metric is requested by the connected vehicles 302 and 304 from any of a third connected vehicle 314 located in the distant area 310, a roadside infrastructure device 316 located in the distant area 310, or a cellular base station 318. In some embodiments, the third connected vehicle 314 is traveling in a direction that is opposite of the connected vehicles 302 and 304. Based on the received QoS metric data, the connected vehicles 302 and 304 can determine if the coordinated action should be performed or not. In one embodiment, this may include determining if a QoS metric for the V2V communications link 308 is sufficient for the entire duration of the coordinated action. If the QoS metric indicates a QoS of the V2V communications link 308 may be deficient at any time during the coordinated action, the connected vehicles 302 and 304 may forego or delay the coordinated action (referred to above as modification of an action).

FIG. 4 is a flowchart of an example method of the present disclosure. The method will be understood to be performed at the level of a vehicle controller of a connected vehicle. The method generally includes a step 402 of receiving a signal that comprises at least a quality of service data of a communications link. The QoS data could include raw QoS or a QoS metric created from raw QoS data.

For example, the vehicle controller can receive a signal or message, such as a beacon message from other connected vehicles within V2V communication range. In these instances, the message or signal can also include a velocity, a location, and a direction of travel of the other connected vehicles. The QoS data can be a direct measurement or a predicted measurement of a QoS of the communications link.

The vehicle controller can receive a signal or message, such as a beacon messages from an infrastructure device such as a roadside infrastructure device or cellular base station. The beacon messages received from the infrastructure device can include aggregated messages/signals. In some embodiments, these messages are received relative to a current location of the connected vehicle. These messages are indicative of a future location for the connected vehicle. In general, the quality of service metric can include any metric disclosed herein related to performance of the communications link (either directly measured or inferred/predicted from other parameters such as vehicle volume). More than one type of QoS data can be evaluated at a time.

The method includes a step 404 of determining an action to be executed by the first connected vehicle. This step could include, for example, the vehicle controller opening an application, performing an autonomous action such as a lane merge, or even a coordinated action with another connected vehicle. The first connected vehicle may utilize a V2V communications link to complete the action. Thus, a QoS of that V2V communications link can be evaluated.

The method may include a step 406 of comparing the quality of service data of the communications link for the first connected vehicle to a threshold value. The threshold value may be related to the quality of service metric included in the signal received by the vehicle controller. That is, each threshold value and comparison can be unique to the quality of service metric being evaluated. Thus, a communications link may be determined to have a poor QoS based on an indication that QoS data for that communications link has not met or exceeded a threshold value. On the other hand the communications link can be determined to have a poor QoS based on an indication that QoS data for that communications link is not at or below a threshold value.

The method can include a step 408 of executing or declining the action by the first connected vehicle in response to a comparison of the quality of service data to the threshold value. To be sure, this can include comparing a QoS metric to a threshold value. By way of example, if a QoS metric of volume of connected vehicles using a communications link meets or exceeds a volume threshold, the vehicle controller of the first connected vehicle can decline to perform the action. For example, if the volume threshold is twenty connected vehicles and the QoS metric of a volume of connected vehicles is thirty connected vehicles, the action determined by the vehicle controller is not performed. Conversely, if the volume threshold is twenty connected vehicles and the QoS metric of a volume of connected vehicles is ten connected vehicles, the action determined by the vehicle controller may be performed.

The method can include an optional step 410 of. For example, if the communications link that is determined to have a QoS that is poor is a V2V connection, the vehicle controller of the first connected vehicle can select to utilize a V2I connection.

While the method above contemplates the vehicle controller determining an action prior to performing a QoS metric evaluation, it will be understood that the vehicle controller can continually or periodically evaluate the QoS metrics for a communications link used by the vehicle controller and then subsequently utilize these types of evaluations to determine if an action should be executed or declined.

The first connected vehicle can request a selective increase in a bandwidth of the communications link when the quality of service metric of the communications link is poor. For example, the first connected vehicle can request that a roadside infrastructure device increase an available bandwidth in its service area, which may improve the quality of service metric of the communications link.

FIG. 5 is a flowchart of another example method of the present disclosure. The method can be performed by a roadside infrastructure device of the present disclosure. The method includes a step 502 of receiving beacon messages or signals from a plurality of connected vehicles in a service area. In accordance with the present disclosure, the beacon messages or signals can include QoS metrics for V2V or V2I communication links in the service area.

A connected vehicle can transmit a request for the signal to any of a second connected vehicle or an infrastructure device. Either or both of these entities can provide a message or signal that includes the quality of service metric for the communications link. The communications link of interest could be associated with a future location of the first connected vehicle (e.g., predicted location) that is in a direction of travel of the first connected vehicle.

The method can include a step 504 of aggregating the QoS metrics for the V2V or V2I communication links in the service area. The method includes a step 506 of receiving a request for QoS metrics for the V2V or V2I communication links in the service area of the roadside infrastructure device. As noted above, this aggregation can be performed over a time window so that the QoS metrics can be utilized in calculations or determinations that are time-based, such as the actions disclosed herein, which are performed over a period of time.

In response, the method includes a step 508 of transmitting the aggregated QoS metric data for V2V or V2I communication links in the service area to the requesting entity. The requesting entity is a connected vehicle that is about to enter the service area of the roadside infrastructure device. The roadside infrastructure device can disseminate the aggregated QoS metric data through use of a cellular base station without request. The roadside infrastructure device can disseminate the aggregated QoS metric data to connected vehicles in the service area of the roadside infrastructure device with or without request. Thus, the roadside infrastructure device can periodically broadcast QoS metric data similarly to a beacon signal.

Figure 6:
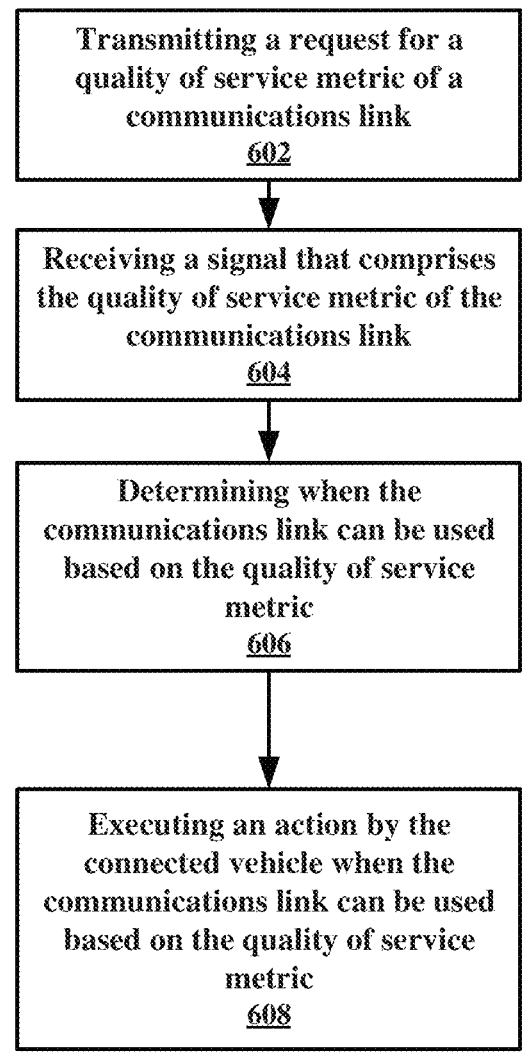
FIG. 6 is a flowchart of an additional example method of the present disclosure related to operations of an example connected vehicle of the present disclosure.

FIG. 6 is another example embodiment of a method of the present disclosure. The method may include a step 602 of transmitting a request for a quality of service metric of a communications link. A connected vehicle is attempting to determine if a V2V link can be used. The method further includes a step 604 of receiving a signal that comprises the quality of service metric of the communications link. As noted above, the signal/message can be received from other connected vehicles or from a roadside infrastructure device.

The method includes a step 606 of determining when the communications link can be used based on the quality of service metric. A vehicle controller can monitor a QoS of the V2V link and determine when a QoS of the V2V link is sufficient. To be sure, the sufficiency of the V2V link may depend on a volume or frequency of data that the vehicle controller transmits to other connected vehicles over the V2V link. Thus, complicated vehicle actions may benefit from a more robust V2V link than a more simplified vehicle action. The method includes a step 608 of executing an action by the connected vehicle when the communications link can be used. To be sure, the monitoring of the QoS metric can allow for execution of an action by the vehicle controller dynamically as the QoS metric of the V2V link changes. Thus, at one point in time the QoS metric of the V2V link may be too low to allow for an action to occur, and subsequently at a second point in time the QoS metric of the V2V link improves and allows for the action to occur. By way of example, a packet error rate of the V2V link at a first point in time is above a packet error rate threshold but a packet error rate of the V2V link at a second point in time is below a packet error rate threshold. The vehicle controller can execute an action that utilizes the V2V link after the second point in time.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining that a first connected vehicle in a first service area desires to perform a vehicle maneuver;
   receiving, by the first connected vehicle, a first signal that comprises quality of service data of the first service area associated with a first communications link used by the first connected vehicle and a second connected vehicle;
   determining, based on route information of the first connected vehicle, that the first connected vehicle will cross into the second service area while performing the vehicle maneuver;
   receiving, by a third connected vehicle in the second service area, a second signal that comprises quality of service data of the second service area associated with a second communications link used by the third connected vehicle and a fourth connected vehicle in the second service area;
   determining, based on the quality of service data of the first service area and on the quality of service of the second service area, whether to perform the vehicle maneuver by the first connected vehicle, wherein the vehicle maneuver will be performed if the quality of service data of the first service area and the quality of service of the second service area are above a threshold, and wherein the vehicle maneuver will be modified if either the quality of service data of the first service area or the quality of service of the second service area below the threshold.

2. The method according to claim 1, wherein the first signal is received from the second connected vehicle, and wherein the communications link is a vehicle-to-vehicle connection.

3. The method according to claim 2, wherein the first signal comprises at least one of a velocity, a location, or a direction of travel of the second connected vehicle.

4. The method according to claim 1, further comprising determining a time frame and a distance within which a coordinated action is performed by the first connected vehicle.

5. The method according to claim 1, wherein the first signal is received from a roadside infrastructure device or a cellular network, and wherein the communications link is a vehicle-to-infrastructure connection between the first connected vehicle and an infrastructure device.

6. The method according to claim 1, wherein the quality of service data comprises any of a packet error rate, an inter-packet delay for packets, a hearing range, a number of messages or signals occurring on the communications link, a number of connected vehicles using the communications link, an available bandwidth of a communications link, or any combinations thereof.

7. The method according to claim 1, wherein determining to perform the vehicle maneuver comprises comparing the quality of service data to a threshold value.

8. A vehicle controller of a first connected vehicle, the vehicle controller comprising:
 a processor; and
 a memory for storing executable instructions, the processor executing the executable instructions to:
  determine that a first connected vehicle in a first service area desires to perform a vehicle maneuver;
  receive, by the first connected vehicle, a first signal that comprises quality of service data of the first service area associated with a first communications link used by the first connected vehicle and a second connected vehicle;
  determine, based on route information of the first connected vehicle, that the first connected vehicle will cross into the second service area while performing the vehicle maneuver;
  receive, by a third connected vehicle in the second service area, a second signal that comprises quality of service data of the second service area associated with a second communications link used by the third connected vehicle and a fourth connected vehicle in the second service area;
  determine, based on the quality of service data of the first service area and on the quality of service of the second service area, whether to perform the vehicle maneuver by the first connected vehicle, wherein the vehicle maneuver will be performed if the quality of service data of the first service area and the quality of service of the second service area are above a threshold, and wherein the vehicle maneuver will be modified if either the quality of service data of the first service area or the quality of service of the second service area below the threshold.

9. The vehicle controller according to claim 8, wherein the processor is further configured to determine a quality of service metric from the quality of service data.

10. The vehicle controller according to claim 9, wherein when the quality of service metric does not meet or exceed a threshold value, the processor is further configured to:
 select third communications link having a quality of service metric that does meet or exceed the threshold value; and
 perform the vehicle maneuver using the third communications link.

11. The vehicle controller according to claim 8, wherein the signal is received from the second connected vehicle, and wherein the communications link being a vehicle-to-vehicle connection.

12. The vehicle controller according to claim 11, wherein the second signal further comprises at least one of a velocity, a location, or a direction of travel of the third connected vehicle, and wherein when the direction of travel of the third connected vehicle is opposite of the direction of travel of the first connected vehicle, the first connected vehicle enters the location of the third connected vehicle during the action.

13. The vehicle controller according to claim 12, wherein the action to be executed by the first connected vehicle comprises a coordinated vehicle maneuver performed by the first connected vehicle with the second connected vehicle.

14. The vehicle controller according to claim 13, wherein the processor is further configured to determine a time frame and a distance over which the coordinated vehicle maneuver is performed by the first connected vehicle.

15. The vehicle controller according to claim 8, wherein the signal is received from an infrastructure device or a cellular network and the communications link is a vehicle-to-infrastructure connection between the first connected vehicle and at least one of the infrastructure device or the cellular network.

16. A method, comprising:
 transmitting a request for a quality of service metric of a first communications link in a first service area;
 transmitting a request for a quality of service metric of a second communications link in a second service area
 receiving a first signal that comprises the quality of service metric of the first communications link in the first service area;
 receiving a second signal that comprises the quality of service metric of the second communications link in the second service area;
 determining when the first communications link in the first service area can be used based on the quality of service metric of the first communications link;
 determining when the second communications link in the second service area can be used based on the quality of service metric of the second communications link;
 executing or declining a vehicle maneuver by a first connected vehicle when the first communications link can be used and when the second communications link can be used, wherein the vehicle maneuver would be performed by the first connected vehicle while traveling from the first service area to the second service area.

17. The method according to claim 16, wherein the vehicle maneuver comprises a coordinated vehicle maneuver performed by the first connected vehicle with a second connected vehicle.

18. The method according to claim 16, wherein the first communications link comprises a vehicle-to-vehicle communication link.

19. The method according to claim 16, wherein the quality of service metric of the first communications link and the quality of service metric of the second communications link comprise any of a packet error rate, an inter-packet delay for packets, a hearing range, a number of messages or signals occurring on the first communications link, a number of connected vehicles using the first communications link, an available bandwidth of the first communications link, or any combinations thereof.

20. The method according to claim 16, further comprising:
 determining that the first communications link cannot be used based on the quality of service metric;

selecting a third communications link having a quality of service metric of the third communications link that can be used based on a quality of service metric of the third communications link; and performing the vehicle maneuver using the third communications link.

* * * * *